United States Patent
Karabinis

(10) Patent No.: US 8,369,776 B2
(45) Date of Patent: *Feb. 5, 2013

(54) APPARATUS AND METHODS FOR POWER CONTROL IN SATELLITE COMMUNICATIONS SYSTEMS WITH SATELLITE-LINKED TERRESTRIAL STATIONS

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 784 days.

This patent is subject to a terminal disclaimer.

(21) Appl. No.: 12/578,913

(22) Filed: Oct. 14, 2009

(65) Prior Publication Data

US 2010/0029269 A1   Feb. 4, 2010

Related U.S. Application Data

(63) Continuation of application No. 10/979,295, filed on Nov. 2, 2004, now Pat. No. 7,639,981.

(51) Int. Cl.
*H04B 7/185* (2006.01)
(52) U.S. Cl. ............................................. 455/13.4
(58) Field of Classification Search .................. 455/13.4
See application file for complete search history.

(56) References Cited

U.S. PATENT DOCUMENTS

| | | |
|---|---|---|
| 4,901,307 A | 2/1990 | Gilhousen et al. |
| 5,073,900 A | 12/1991 | Mallinckrodt |
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,535,430 A * | 7/1996 | Aoki et al. ............... 455/552.1 |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |
| 5,761,605 A | 6/1998 | Tawil et al. |

(Continued)

FOREIGN PATENT DOCUMENTS

| | | |
|---|---|---|
| EP | 0 506 255 A2 | 9/1992 |
| EP | 0 597 225 A1 | 5/1994 |

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

(Continued)

*Primary Examiner* — Yuwen Pan
*Assistant Examiner* — Ankur Jain
(74) *Attorney, Agent, or Firm* — Myers Bigel Sibley & Sajovec, P.A.

(57) ABSTRACT

A signal power control loop is provided for a link between a terrestrial station and a terminal when the terminal and a satellite are linked via the terrestrial station. The signal power control loop may control transmitted signal power of the terminal and/or the terrestrial station. In some embodiments, the signal power control loop controls transmitted signal power of the terminal and/or the terrestrial station independent of signal power control for a link between the terrestrial station and the satellite.

19 Claims, 9 Drawing Sheets

U.S. PATENT DOCUMENTS

| | | |
|---|---|---|
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,272,340 B1 * | 8/2001 | Wright et al. ............... 455/427 |
| 6,324,405 B1 | 11/2001 | Young et al. |
| 6,339,707 B1 | 1/2002 | Wainfan et al. |
| 6,418,147 B1 | 7/2002 | Wiedeman |
| 6,449,461 B1 | 9/2002 | Otten |
| 6,522,865 B1 | 2/2003 | Otten |
| 6,628,919 B1 | 9/2003 | Curello et al. |
| 6,684,057 B2 | 1/2004 | Karabinis |
| 6,735,437 B2 | 5/2004 | Mayfield et al. |
| 6,775,251 B1 | 8/2004 | Wiedeman |
| 6,785,543 B2 | 8/2004 | Karabinis |
| 6,856,787 B2 | 2/2005 | Karabinis |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,031,702 B2 | 4/2006 | Karabinis et al. |
| 7,039,400 B2 | 5/2006 | Karabinis et al. |
| 7,062,267 B2 | 6/2006 | Karabinis |
| 7,092,708 B2 | 8/2006 | Karabinis |
| 7,113,743 B2 | 9/2006 | Karabinis |
| 7,113,778 B2 | 9/2006 | Karabinis |
| 7,155,340 B2 | 12/2006 | Churan |
| 7,174,127 B2 | 2/2007 | Otten et al. |
| 7,181,161 B2 | 2/2007 | Karabinis |
| 7,203,490 B2 | 4/2007 | Karabinis |
| 7,218,931 B2 | 5/2007 | Karabinis |
| 7,295,807 B2 | 11/2007 | Karabinis |
| 7,340,213 B2 | 3/2008 | Karabinis et al. |
| 7,418,236 B2 | 8/2008 | Levin et al. |
| 7,418,263 B2 | 8/2008 | Dutta et al. |
| 7,421,342 B2 | 9/2008 | Churan |
| 7,437,123 B2 | 10/2008 | Karabinis et al. |
| 7,444,170 B2 | 10/2008 | Karabinis |
| 7,447,501 B2 | 11/2008 | Karabinis |
| 7,453,396 B2 | 11/2008 | Levin et al. |
| 7,453,920 B2 | 11/2008 | Churan |
| 7,454,175 B2 | 11/2008 | Karabinis |
| 7,457,269 B1 | 11/2008 | Grayson |
| 7,558,568 B2 | 7/2009 | Karabinis |
| 7,574,206 B2 | 8/2009 | Karabinis |
| 7,577,400 B2 | 8/2009 | Karabinis et al. |
| 7,587,171 B2 | 9/2009 | Evans et al. |
| 7,593,691 B2 | 9/2009 | Karabinis |
| 7,593,724 B2 | 9/2009 | Karabinis |
| 7,593,725 B2 | 9/2009 | Karabinis |
| 7,593,726 B2 | 9/2009 | Karabinis et al. |
| 7,596,111 B2 | 9/2009 | Karabinis |
| 7,599,656 B2 | 10/2009 | Karabinis |
| 7,603,081 B2 | 10/2009 | Karabinis |
| 7,603,117 B2 | 10/2009 | Karabinis |
| 7,606,590 B2 | 10/2009 | Karabinis |
| 7,609,666 B2 | 10/2009 | Karabinis |
| 7,620,394 B2 | 11/2009 | Good et al. |
| 7,623,859 B2 | 11/2009 | Karabinis |
| 7,623,867 B2 | 11/2009 | Karabinis |
| 7,627,285 B2 | 12/2009 | Karabinis |
| 7,634,229 B2 | 12/2009 | Karabinis |
| 7,634,234 B2 | 12/2009 | Karabinis |
| 7,636,546 B2 | 12/2009 | Karabinis |
| 7,636,566 B2 | 12/2009 | Karabinis |
| 7,636,567 B2 | 12/2009 | Karabinis et al. |
| 7,639,981 B2 | 12/2009 | Karabinis |
| 7,653,348 B2 | 1/2010 | Karabinis |
| 7,664,460 B2 | 2/2010 | Karabinis et al. |
| 7,696,924 B2 | 4/2010 | Levin et al. |
| 7,706,746 B2 | 4/2010 | Karabinis et al. |
| 7,706,748 B2 | 4/2010 | Dutta |
| 7,706,826 B2 | 4/2010 | Karabinis |
| 7,738,837 B2 | 6/2010 | Karabinis |
| 7,747,229 B2 | 6/2010 | Dutta |
| 7,751,823 B2 | 7/2010 | Karabinis |
| 7,756,490 B2 | 7/2010 | Karabinis |
| 7,783,287 B2 | 8/2010 | Karabinis |
| 7,792,069 B2 | 9/2010 | Karabinis |
| 7,792,488 B2 | 9/2010 | Karabinis et al. |
| 7,796,985 B2 | 9/2010 | Karabinis |
| 7,796,986 B2 | 9/2010 | Karabinis |
| 7,801,520 B2 | 9/2010 | Karabinis |
| 7,813,700 B2 | 10/2010 | Zheng et al. |
| 7,817,967 B2 | 10/2010 | Karabinis et al. |
| 7,831,201 B2 | 11/2010 | Karabinis |
| 7,831,202 B2 | 11/2010 | Karabinis |
| 7,831,251 B2 | 11/2010 | Karabinis et al. |
| 7,856,211 B2 | 12/2010 | Karabinis |
| 2002/0122408 A1 | 9/2002 | Mullins |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0022625 A1 | 1/2003 | Otten et al. |
| 2003/0054760 A1 * | 3/2003 | Karabinis .................... 455/12.1 |
| 2003/0054762 A1 | 3/2003 | Karabinis |
| 2003/0054814 A1 | 3/2003 | Karabinis et al. |
| 2003/0054815 A1 | 3/2003 | Karabinis |
| 2003/0068978 A1 | 4/2003 | Karabinis et al. |
| 2003/0073436 A1 | 4/2003 | Karabinis et al. |
| 2003/0149986 A1 | 8/2003 | Mayfield et al. |
| 2003/0153267 A1 | 8/2003 | Karabinis |
| 2003/0153308 A1 | 8/2003 | Karabinis |
| 2004/0072539 A1 | 4/2004 | Monte et al. |
| 2004/0102156 A1 | 5/2004 | Loner |
| 2004/0121727 A1 | 6/2004 | Karabinis |
| 2004/0142660 A1 | 7/2004 | Churan |
| 2004/0192200 A1 | 9/2004 | Karabinis |
| 2004/0192293 A1 | 9/2004 | Karabinis |
| 2004/0192395 A1 | 9/2004 | Karabinis |
| 2004/0203393 A1 | 10/2004 | Chen |
| 2004/0203538 A1 * | 10/2004 | Leppanen et al. ............ 455/101 |
| 2004/0203742 A1 | 10/2004 | Karabinis |
| 2004/0240525 A1 | 12/2004 | Karabinis et al. |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0064813 A1 | 3/2005 | Karabinis |
| 2005/0079816 A1 | 4/2005 | Singh et al. |
| 2005/0090256 A1 | 4/2005 | Dutta |
| 2005/0118948 A1 | 6/2005 | Karabinis et al. |

| | | |
|---|---|---|
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0040613 A1 | 2/2006 | Karabinis et al. |
| 2006/0040659 A1 | 2/2006 | Karabinis |
| 2006/0094420 A1 | 5/2006 | Karabinis |
| 2006/0135058 A1 | 6/2006 | Karabinis |
| 2006/0135070 A1 | 6/2006 | Karabinis |
| 2006/0165120 A1 | 7/2006 | Karabinis |
| 2006/0194576 A1 | 8/2006 | Karabinis et al. |
| 2006/0205347 A1 | 9/2006 | Karabinis |
| 2006/0205367 A1 | 9/2006 | Karabinis |
| 2006/0211452 A1 | 9/2006 | Karabinis |
| 2006/0246838 A1 | 11/2006 | Karabinis |
| 2006/0252368 A1 | 11/2006 | Karabinis |
| 2007/0010246 A1 | 1/2007 | Churan |
| 2007/0015460 A1 | 1/2007 | Karabinis et al. |
| 2007/0021059 A1 | 1/2007 | Karabinis et al. |
| 2007/0021060 A1 | 1/2007 | Karabinis et al. |
| 2007/0037514 A1 | 2/2007 | Karabinis |
| 2007/0072545 A1 | 3/2007 | Karabinis et al. |
| 2007/0099562 A1 | 5/2007 | Karabinis et al. |
| 2007/0123252 A1 | 5/2007 | Tronc et al. |
| 2007/0129019 A1 | 6/2007 | Otten et al. |
| 2007/0184849 A1 | 8/2007 | Zheng |
| 2007/0192805 A1 | 8/2007 | Dutta et al. |
| 2007/0202816 A1 | 8/2007 | Zheng |
| 2007/0243866 A1 | 10/2007 | Karabinis |
| 2007/0281612 A1 | 12/2007 | Benjamin et al. |
| 2007/0293214 A1 | 12/2007 | Ansari et al. |
| 2008/0008264 A1 | 1/2008 | Zheng |
| 2008/0032671 A1 | 2/2008 | Karabinis |
| 2008/0113666 A1 | 5/2008 | Monte et al. |
| 2008/0119190 A1 | 5/2008 | Karabinis |
| 2008/0160993 A1 | 7/2008 | Levin et al. |
| 2008/0182572 A1 | 7/2008 | Tseytlin et al. |
| 2008/0214207 A1 | 9/2008 | Karabinis |
| 2008/0268836 A1 | 10/2008 | Karabinis et al. |
| 2009/0011704 A1 | 1/2009 | Karabinis |
| 2009/0029696 A1 | 1/2009 | Karabinis |
| 2009/0042509 A1 | 2/2009 | Karabinis et al. |
| 2009/0075645 A1 | 3/2009 | Karabinis |
| 2009/0088151 A1 | 4/2009 | Karabinis |
| 2009/0137203 A1 | 5/2009 | Karabinis et al. |
| 2009/0156154 A1 | 6/2009 | Karabinis et al. |
| 2009/0170427 A1 | 7/2009 | Karabinis |
| 2009/0170428 A1 | 7/2009 | Karabinis |
| 2009/0170429 A1 | 7/2009 | Karabinis |
| 2009/0186622 A1 | 7/2009 | Karabinis |
| 2009/0231187 A1 | 9/2009 | Churan |
| 2009/0296628 A1 | 12/2009 | Karabinis |
| 2009/0305697 A1 | 12/2009 | Karabinis et al. |
| 2009/0312013 A1 | 12/2009 | Karabinis |
| 2010/0009677 A1 | 1/2010 | Karabinis et al. |
| 2010/0015971 A1 | 1/2010 | Good et al. |
| 2010/0029269 A1 | 2/2010 | Karabinis |
| 2010/0035604 A1 | 2/2010 | Dutta et al. |
| 2010/0035605 A1 | 2/2010 | Karabinis |
| 2010/0035606 A1 | 2/2010 | Karabinis |
| 2010/0039967 A1 | 2/2010 | Karabinis et al. |
| 2010/0041394 A1 | 2/2010 | Karabinis |
| 2010/0041395 A1 | 2/2010 | Karabinis |
| 2010/0041396 A1 | 2/2010 | Karabinis |
| 2010/0048201 A1 | 2/2010 | Karabinis |
| 2010/0054160 A1 | 3/2010 | Karabinis |
| 2010/0120419 A1 | 5/2010 | Zheng et al. |
| 2010/0141509 A1 | 6/2010 | Levin et al. |
| 2010/0184370 A1 | 7/2010 | Zheng et al. |
| 2010/0184381 A1 | 7/2010 | Zheng et al. |
| 2010/0184427 A1 | 7/2010 | Zheng et al. |
| 2010/0190507 A1 | 7/2010 | Karabinis et al. |
| 2010/0203828 A1 | 8/2010 | Zheng |
| 2010/0203884 A1 | 8/2010 | Zheng et al. |
| 2010/0210209 A1 | 8/2010 | Karabinis et al. |
| 2010/0210262 A1 | 8/2010 | Karabinis et al. |
| 2010/0240362 A1 | 9/2010 | Karabinis |

FOREIGN PATENT DOCUMENTS

| | | |
|---|---|---|
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 0 987 841 | 3/2000 |
| EP | 1 059 826 A1 | 12/2000 |
| EP | 1 193 989 A1 | 4/2002 |
| EP | 1 944 885 A2 | 7/2008 |
| EP | 1 569 363 B1 | 11/2008 |
| WO | WO 01/54314 A1 | 7/2001 |

OTHER PUBLICATIONS

Ayyagari et al., "A satellite-augmented cellular network concept", *Wireless Networks*, vol. 4, 1998, pp. 189-198.

International Search Report and Written Opinion of the International Searching Authority for International Patent Application No. PCT/US2005/039854 mailed on Apr. 18, 2006.

"Flexibility for Delivery of Communications by Mobile Satellite Service Providers in the 2GHz band, the L-Band, and the 1.6/2.4 Bands" FCC 03-15, pp. 1-9, 77-84, 180-218 (Feb. 10, 2003).

International Preliminary Report on Patentability, PCT Application No. PCT/US2005/039854, Oct. 16, 2006.

\* cited by examiner

APPARATUS AND METHODS FOR POWER CONTROL IN SATELLITE COMMUNICATIONS SYSTEMS WITH SATELLITE-LINKED TERRESTRIAL STATIONS

CROSS REFERENCE TO RELATED APPLICATION

This application is a continuation of U.S. patent application Ser. No. 10/979,295, filed Nov. 2, 2004 now U.S. Pat. No. 7,639,981, entitled Apparatus and Methods for Power Control In Satellite Communications Systems With Satellite-Linked Terrestrial Stations, assigned to the assignee of the present application, the disclosure of which is hereby incorporated herein by reference in its entirety as if set forth fully herein.

BACKGROUND OF THE INVENTION

This invention relates to wireless communications systems and methods, and more particularly, to satellite communications systems and methods.

Satellite communications systems and methods are widely used for voice and data communications. Satellite communications systems and methods generally employ at least one space-based component, such as one or more satellites, that is configured to wirelessly communicate with terminals.

A satellite communications system or method may utilize a single radiation pattern (antenna beam), such as a "global" beam, covering an entire area (footprint) served by the system. Alternatively, in cellular satellite communications systems and methods, multiple radiation patterns (antenna beams, or spot beams) are provided, each of which can serve distinct geographic areas in the overall service region of a satellite system, to collectively serve an overall satellite system footprint. Thus, a cellular architecture similar to that used in conventional terrestrial cellular/PCS communications systems and methods can be implemented in cellular satellite-based systems and methods. The satellite (space segment) typically communicates with terminals over a bidirectional communications pathway, with radio communication signals being communicated from the satellite to a terminal over a downlink or forward link, and from the terminal to the satellite over an uplink or return link.

As is well known to those having skill in the art, terrestrial networks can enhance satellite communications system availability, efficiency and/or economic viability by terrestrially reusing and/or re-radiating at least some of the frequency bands that are allocated to and/or radiated by the satellite communications system. In particular, it is known that it may be difficult for satellite communications systems to reliably serve densely populated areas, because the satellite signal may be blocked by high-rise structures and/or may not penetrate into buildings. As a result, the satellite band spectrum may be underutilized or unutilized in such areas. The use of terrestrial retransmission techniques of at least some of the satellite band frequencies can reduce or eliminate this problem.

Moreover, the capacity of a system comprising satellite and terrestrial retransmission of at least some of the satellite band frequencies can be increased significantly, relative to a corresponding satellite-only system, since terrestrial frequency reuse can be much denser (compact) than that of a satellite-only system. In fact, capacity may be enhanced where it may be mostly needed, i.e., in densely populated urban/industrial/commercial areas. As a result, the overall (hybrid) system may become more economically viable, as it may be able to serve a much larger subscriber base. Finally, terminals for a satellite communications system having a terrestrial component within the same satellite frequency band and using substantially the same air interface for both terrestrial and satellite communications can be more cost effective and/or aesthetically appealing. Conventional dual band/dual mode alternatives, such as the well known Thuraya, Iridium and/or Globalstar dual mode satellite/terrestrial radiotelephone systems, may duplicate some components, which may lead to increased cost, size and/or weight of the radiotelephone.

U.S. Pat. No. 6,684,057, to coinventor Karabinis, and entitled Systems and Methods for Terrestrial Reuse of Cellular Satellite Frequency Spectrum, the disclosure of which is hereby incorporated herein by reference in its entirety as if set forth fully herein, describes that a satellite communications frequency can be reused terrestrially by an ancillary terrestrial network even within the same satellite cell, using interference cancellation techniques. United States Patent Application Publication 2003/0153267 (U.S. patent application Ser. No. 10/151,567, filed May 20, 2002) describes a satellite communications system that includes a terrestrial terminal interface subsystem, e.g., a terrestrial base station, operative to communicate with a satellite gateway via a communications satellite using a first radio interface and to communicate with wireless terminals over a geographic area using a second radio interface.

SUMMARY OF THE INVENTION

In some embodiments of the present invention, methods are provided for operating a satellite wireless communications system including a satellite configured to communicate with terminals directly and to communicate with terminals indirectly via a terrestrial station. A signal power control loop is provided for a link between the terrestrial station and a terminal when the terminal and the satellite are linked via the terrestrial station. The signal power control loop may control transmitted signal power of the terminal and/or the terrestrial station. In some embodiments, the signal power control loop controls transmitted signal power of the terminal and/or the terrestrial station independent of signal power control for a link between the terrestrial station and the satellite.

In further embodiments, a first signal power control loop is provided for a first link between the terrestrial station and the terminal. A second signal power control loop is provided for a combination of the first link and a second link between the terrestrial station and the satellite concurrent with provision of the first signal power control loop. In a nested configuration, the first control loop may be responsive to the second control loop.

In further embodiments of the present invention, a satellite wireless communications system includes a satellite configured to communicate with terminals directly and to communicate with terminals indirectly via a terrestrial station. The system further includes first signal power control loop that controls a first link between the terrestrial station and the terminal when the terminal and the satellite are linked via the terrestrial station and a second signal power control loop that controls a second link between the terminal and the satellite serving the satellite when the terminal is in direct communication with the satellite. The first signal power control loop may control transmitted signal power of the terminal and/or the terrestrial station. In some embodiments of the present invention, the first signal power control loop controls transmitted signal power of the terminal and/or the terrestrial station independent of signal power control for a link between the terrestrial station and the satellite.

In additional embodiments of the present invention, a satellite wireless communications system includes a satellite and a terrestrial station. The satellite is configured to communicate with terminals directly and to communicate with terminals indirectly via the terrestrial station. The system further includes a signal power controller operative to control a signal power control loop for a link between the terrestrial station and a terminal when the terminal and the satellite are linked via the terrestrial station. The signal power controller may be positioned at the terrestrial station and/or the terminal.

In some embodiments, the terrestrial station comprises a first demodulation and regeneration unit configured to demodulate a signal received from the satellite and to regenerate the demodulated signal to produce a first regenerated signal, a first modulator configured to modulate the first regenerated signal, and a first power amplifier configured to amplify the modulated first regenerated signal for transmission to the terminal. The terrestrial station further includes a second demodulation and regeneration unit configured to demodulate a received signal from the terminal and to regenerate the demodulated signal to produce a second regenerated signal, a second modulator configured to modulate the second regenerated signal, and a second power amplifier configured to amplify the modulated second regenerated signal for transmission to the satellite. The first demodulation and regeneration unit may be operative to extract transmitted power control information from the signal received from the satellite and to responsively control the second power amplifier. The second demodulation and regeneration unit may be operative to extract transmitted power control information from the signal received from the satellite and to responsively control the first power amplifier. In further embodiments, the first demodulation and regeneration unit may be operative to determine received signal power for the signal received from the satellite and to responsively provide power control information to the second demodulation and regeneration unit. The second demodulation and regeneration unit may be operative to determine received signal power for the signal received from the terminal and to responsively provide power control information to the first demodulation and regeneration unit.

According to additional aspects of the present invention, a terrestrial station is provided for a satellite wireless communications system including a satellite configured to communicate with terminals directly and to communicate with terminals indirectly via the terrestrial station. The terrestrial station includes an interface converter operative to translate between air interfaces for a first link between the terrestrial station and a terminal and second link between the terrestrial station and the satellite and to communicate power control information for a power control loop for the first link.

In some embodiments, the interface converter includes a first demodulation and regeneration unit configured to demodulate a signal received from the satellite and to regenerate the demodulated signal to produce a first regenerated signal, a first modulator configured to modulate the first regenerated signal, and a first power amplifier configured to amplify the modulated first regenerated signal for transmission to the terminal. The terrestrial station further includes a second demodulation and regeneration unit configured to demodulate a received signal from the terminal and to regenerate the demodulated signal to produce a second regenerated signal, a second modulator configured to modulate the second regenerated signal, and a second power amplifier configured to amplify the modulated second regenerated signal for transmission to the satellite. The first demodulation and regeneration unit may be operative to extract transmitted power control information from the signal received from the satellite and to responsively control the second power amplifier. The second demodulation and regeneration unit may be operative to extract transmitted power control information from the signal received from the terminal and to responsively control the first power amplifier. The first demodulation and regeneration unit may also be operative to determine received signal power for the signal received from the satellite and to responsively provide power control information to the second demodulation and regeneration unit. The second demodulation and regeneration unit may also be operative to determine received signal power for the signal received from the terminal and to responsively provide power control information to the first demodulation and regeneration unit.

DETAILED DESCRIPTION

Figure 1:
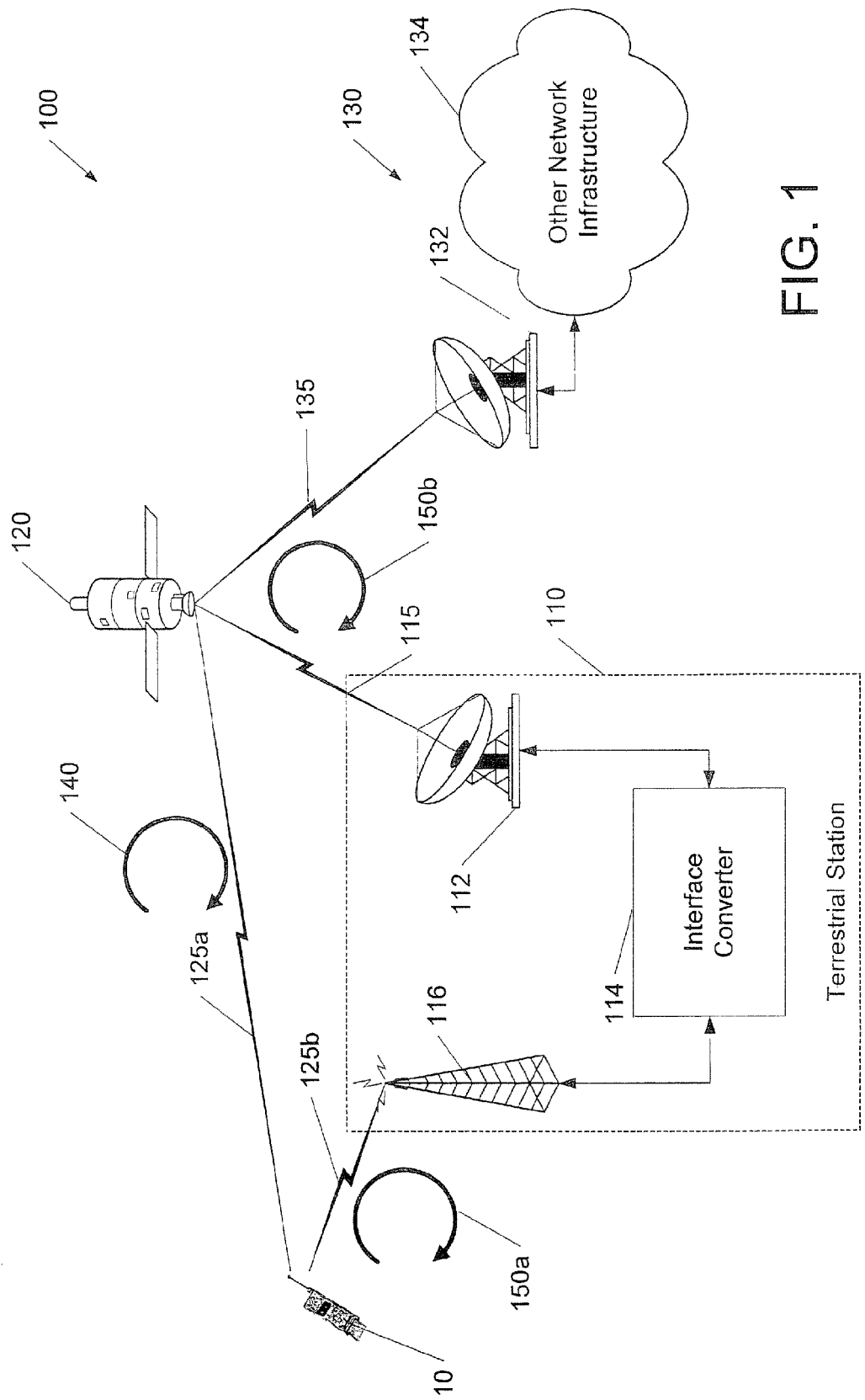
FIG. 1 is a schematic diagram illustrating a satellite communications system according to some embodiments of the present invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "terminal" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and a pager, Internet/intranet access, Web browser, organizer, calendar and/or a global positioning system (GPS) receiver; and/or conventional laptop and/or palmtop computers or other appliances, which include a radio frequency transceiver. Terminals include, but are not limited to, devices or equipment that may have time-varying or fixed geographic coordinates, and may be portable, transportable, installed in a vehicle (aeronautical, maritime, or land-based), airborne and/or situated and/or configured to operate locally and/or in a distributed fashion at any other location(s) on earth, in the atmosphere and/or in space. A terminal may also be referred to herein as a radioterminal or radiotelephone.

FIG. 1 illustrates a satellite communications system 100 according to some embodiments of the present invention. The system 100 includes a satellite 120 that is in communications with other infrastructure components 130, e.g., a satellite gateway 132. It will be appreciated that other infrastructure 134 may include, for example, components of an ancillary terrestrial network (ATN) as described in the aforementioned U.S. Pat. No. 6,684,057. The satellite 120 is configured to communicate with a terminal 10 over a radio link 125a. The system 100 further includes a satellite-linked terrestrial station 110 including a satellite antenna 112 configured to communicate with the satellite 120 over a link 115 and a terrestrial antenna 116 configured to communicate with the terminal 10 over a link 125b. The terrestrial station 110 further includes an interface converter 114 operative to convert between the air interfaces used on the links 115 and 125b. The links 115, 125b and the terrestrial station 10 may provide an ancillary path for communications between the system 100 and the terminal 10, as described in the aforementioned United States Patent Application Publication 2003/0153267. It will be appreciated that the links 125a, 125b, 115 and 135 may be unidirectional or bidirectional, e.g., the terrestrial station 110 may serve as a bidirectional relay station or may be a transmit-only or receive-only station, as described in the aforementioned United States Patent Application Publication 2003/0153267. It will be further understood that the terrestrial station 110 may be positioned and/or confined at substantially a single geographic site, configured on a vehicle (land-mobile, aeronautical, maritime, and/or other), or may be operative in a distributed configuration over a plurality of geographic sites, e.g., using a plurality of geographically distributed terrestrial antennas.

As further shown in FIG. 1, when the satellite 120 is in direct communication with the terminal 10, a power control loop 140 is provided between the terminal 10 and the satellite 120 and/or the satellite gateway 132. For example, the power control loop 140 may comprise a power control loop for the link 125a, and a separate power control loop could be provided for the satellite-gateway link 135. Alternatively, the power control loop 140 may be operatively configured to compensate for channel variations between the terminal 10 and the satellite gateway 132, i.e., to control signal power across an aggregation of the links 125a, 135. In still other embodiments, the power control loop 140 may have a "nested" structure, e.g., an inner loop may be provided for the link 125a between the terminal 10 and the satellite 120, and an outer power control loop may be configured to extend between the terminal 10 and the gateway 132. It will be further appreciated that the power control loop 140 may comprise respective power control loops for transmissions in respective directions supported by the link 125a, e.g., separate power control loops configured to control transmissions from the terminal 10 and the satellite 120, respectively.

Still referring to FIG. 1, when the terminal 10 is indirectly communicating with the satellite 120 via the terrestrial station 10, a power control loop 150a may be provided between the terminal 10 and the terrestrial station 110. As shown, a separate power control loop 150b may be provided between the terrestrial station 110 and the satellite 120, gateway 132 and/or other components of the system 100. Some embodiments of the present invention arise from a realization that such an arrangement may be advantageous due to significant differences in signal propagation conditions and delays for the terrestrial link 125b vis a vis the satellite links 115, 135. It will be appreciated that the power control loop 150a may comprise a single loop if the link 125b is unidirectional, or, if the link 125b is bidirectional, may include respective power control loops for transmissions in respective directions supported by the link 125b, e.g., separate power control loops configured to control transmissions from the terminal 10 and the terrestrial station 110, respectively.

Figure 2:
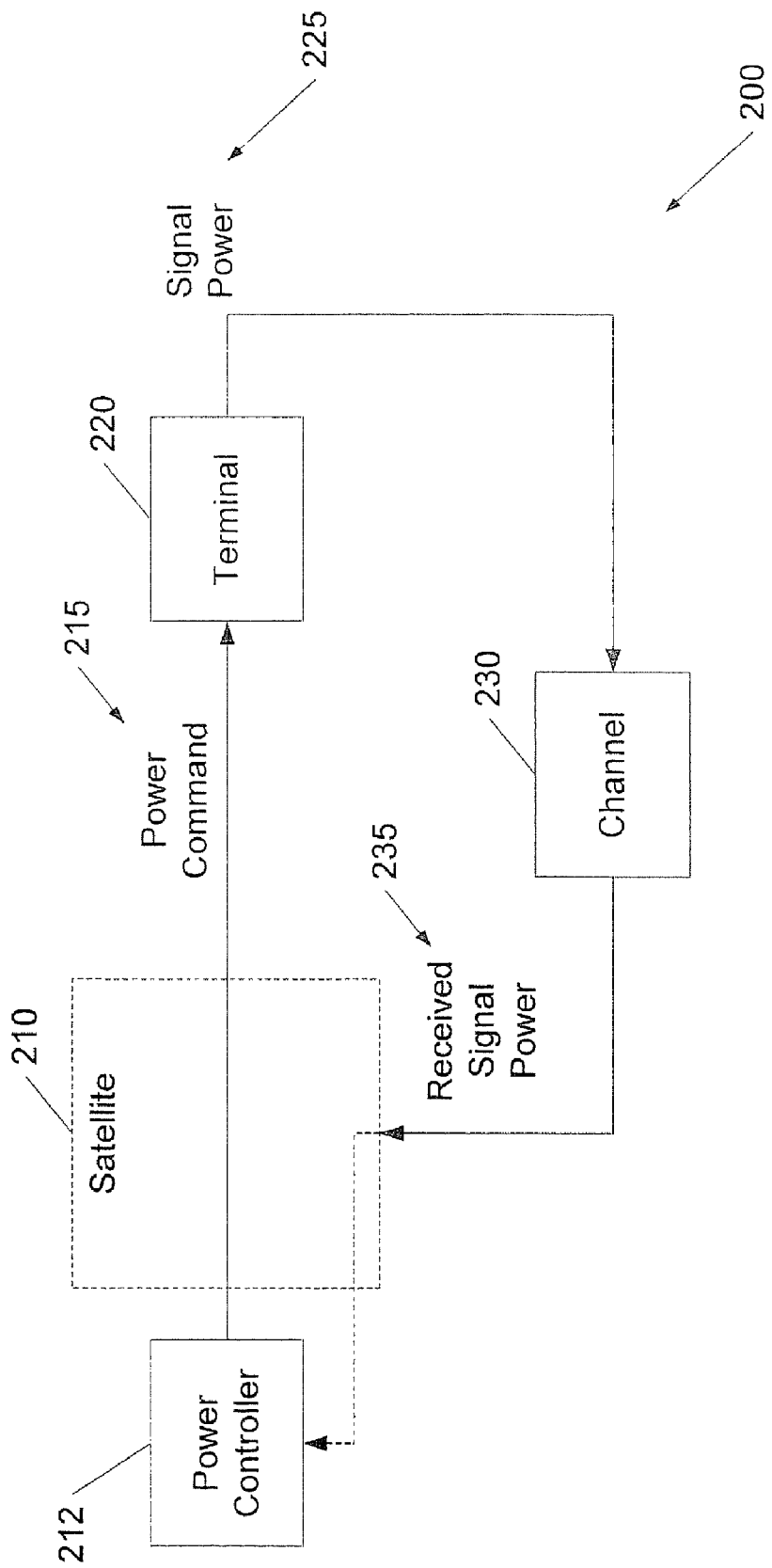
FIGS. 2-8 are schematic diagrams illustrating signal power control loops according to various embodiments of the present invention.
Figure 3:
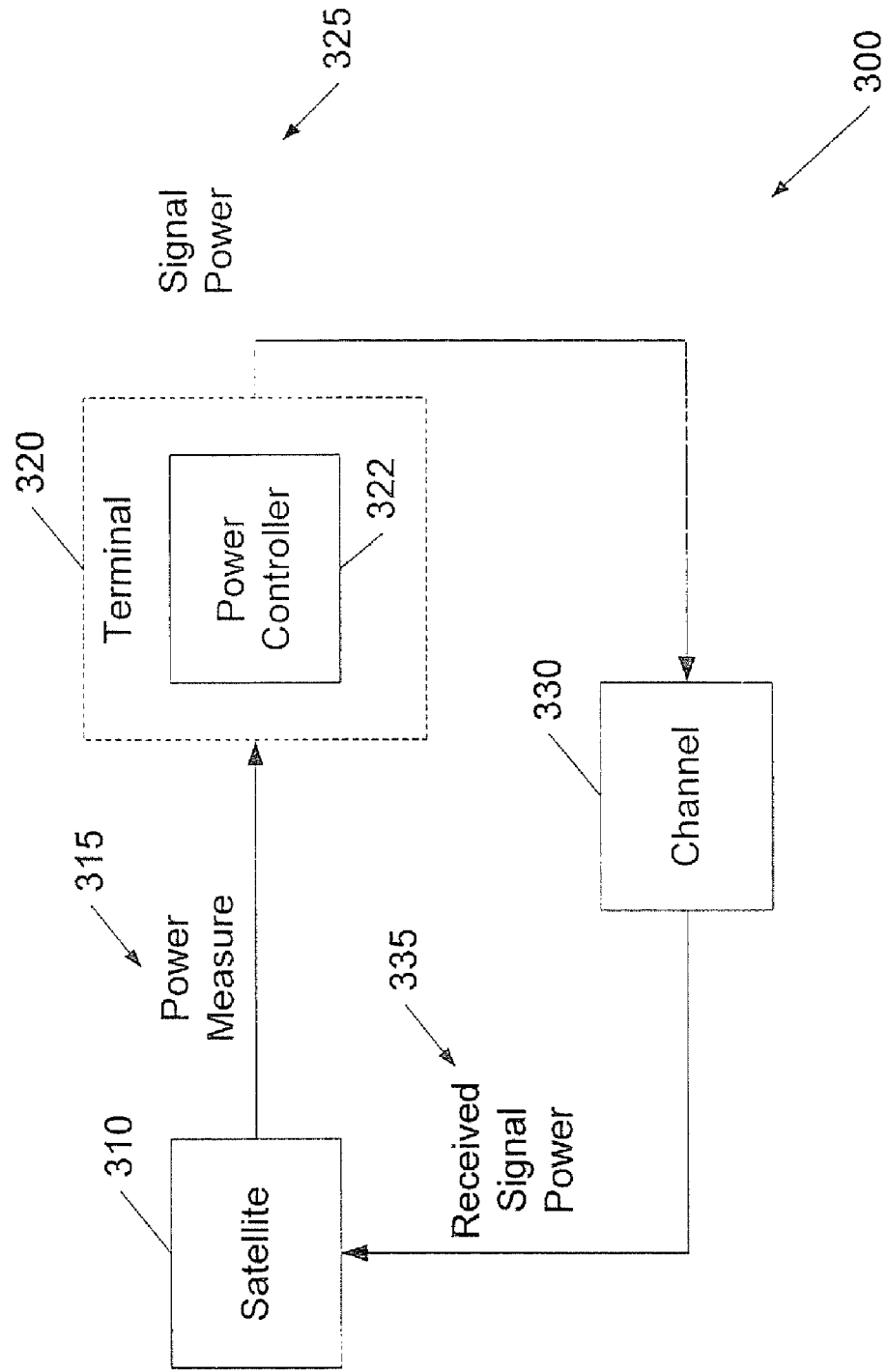
Figure 4:
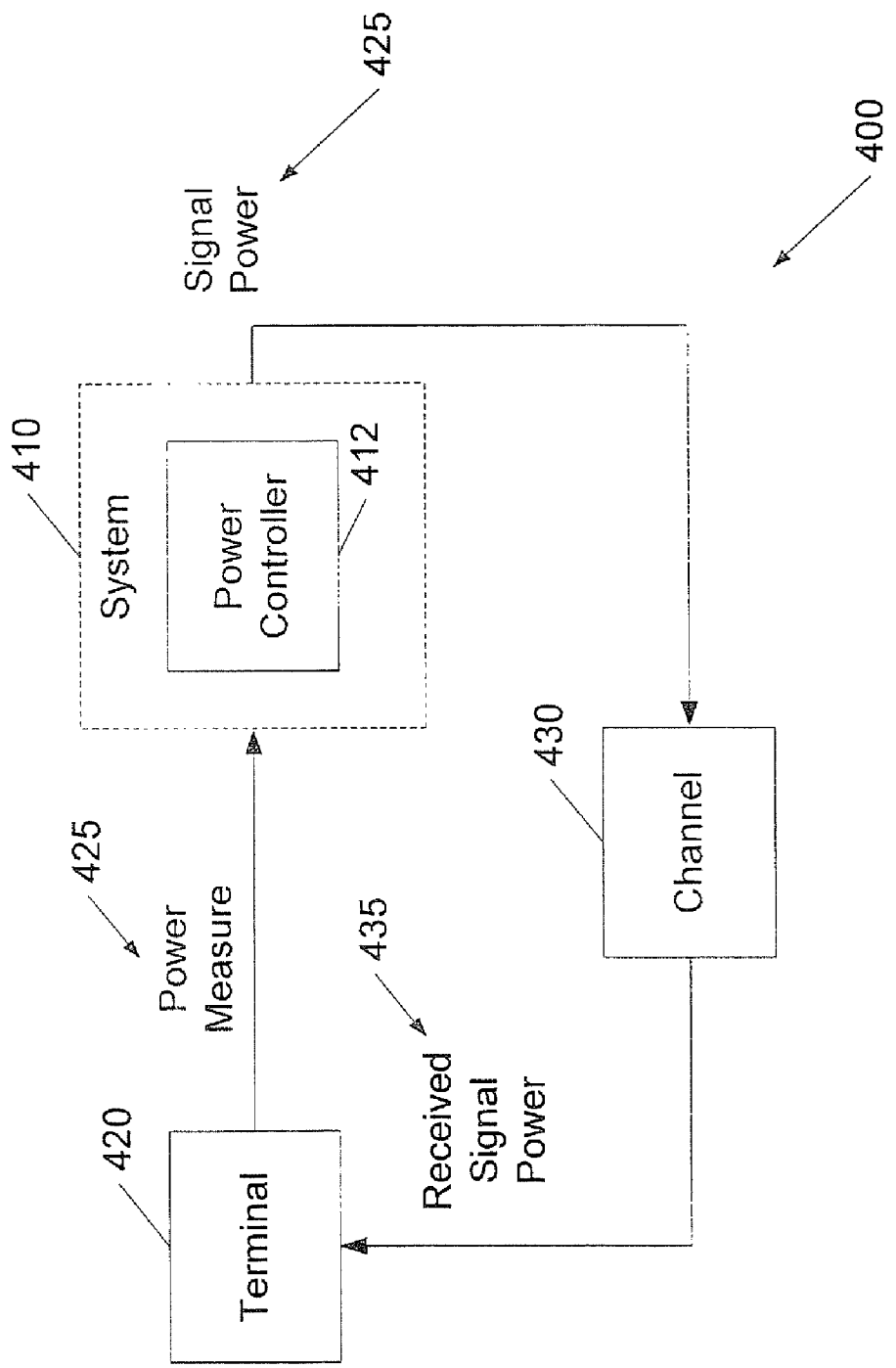

FIGS. 2-4 illustrate exemplary power control loops 200, 300, 400 that may be used when a terminal is directly communicating with a satellite in a satellite communications system configured as shown in FIG. 1. FIG. 2 illustrates an exemplary power control loop 200 for controlling signal power for radio signals transmitted by a terminal 220 to a satellite 210 of a satellite communications system, such as the system 100 illustrated in FIG. 1. In particular, FIG. 2 illustrates a terminal signal power control architecture in which the satellite 210 and/or other satellite communications system infrastructure controls the transmitted signal power of the terminal 220. A signal power controller 212, which may be located at the satellite 210 and/or in other system infrastructure linked to the satellite 210, such as a ground-based satellite gateway, is operative to generate a signal power command 215 responsive to a measure of received power 235 of a signal transmitted over a channel 230 by the terminal 220. The satellite 210 transmits the power command 215 to the terminal 220, which receives the power command 215 and responsively controls its transmitted signal power 225. It will be appreciated that the power command 215 may comprise, for example, an indication of a desired absolute power level (e.g., X watts) and/or an incremental command, e.g., a command to increase or decrease the transmitted signal power 225 by a predetermined (constant or variable) amount.

FIG. 3 illustrates an alternative power control loop 300 in which a power controller 322 is resident in a terminal 320, rather than in the satellite communications system. A satellite 310 receives signals from the terminal 320 over a channel 330. The satellite 310 (and/or other components of the system infrastructure coupled thereto) responsively determines received signal power 335 for the signal and transmits a measure 315 of the received signal power to the terminal 320. The power controller 322 controls a transmitted signal power 325 of the terminal 320 responsive to the communicated power measure 315, i.e., using the power measure 315 as a feedback signal.

FIG. 4 illustrates an exemplary power control loop 400 that controls signal power for radio signals transmitted to a terminal 420 by a satellite of a satellite communications system, such as the system 100 illustrated in FIG. 1. The terminal 420 receives radio signals transmitted by the satellite communications system 410 (i.e. from a satellite) over a channel 430.

The satellite communications system 410 includes a signal power controller 412 that is operative to control its transmitted signal power 425 responsive to a measure 425 of received signal power 435 generated by the terminal 420. It will be appreciated that, in some embodiments of the present invention, an alternative to the configuration in FIG. 4 could involve providing the signal power control capability in the terminal 420, e.g., by providing a controller in the terminal 420 that transmits power commands to the satellite communications system 410.

Figure 5:
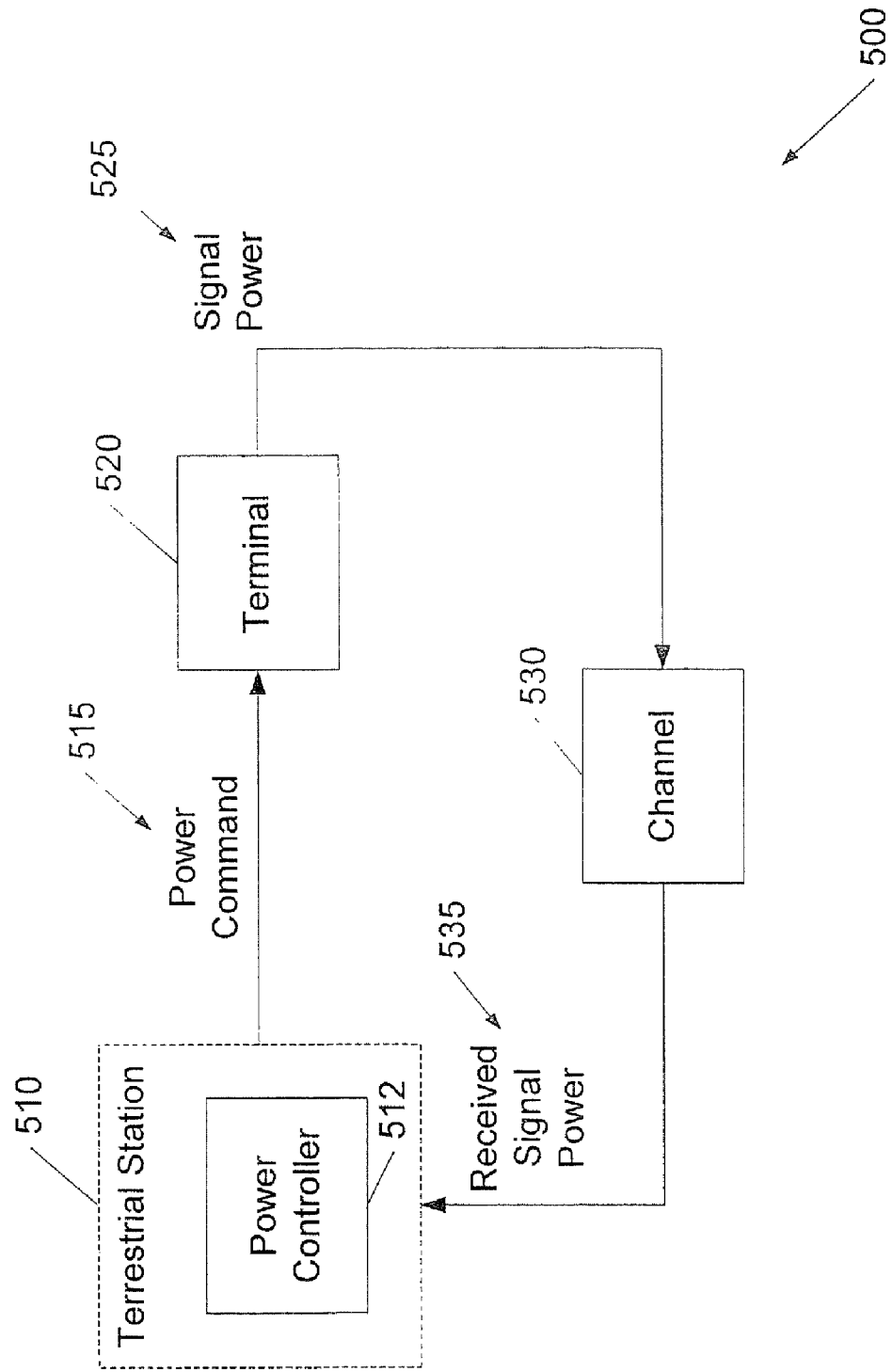
Figure 6:
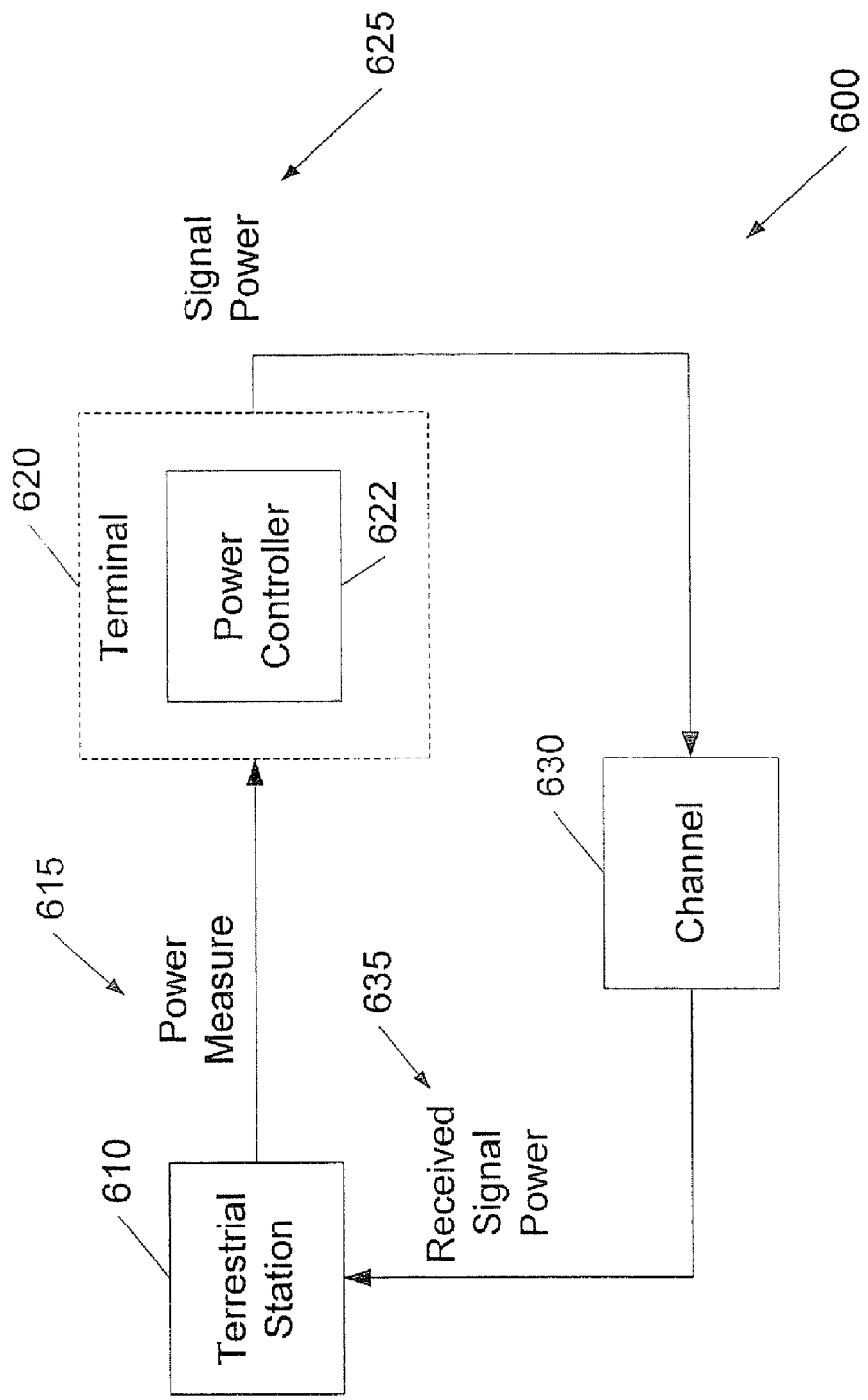
Figure 7:
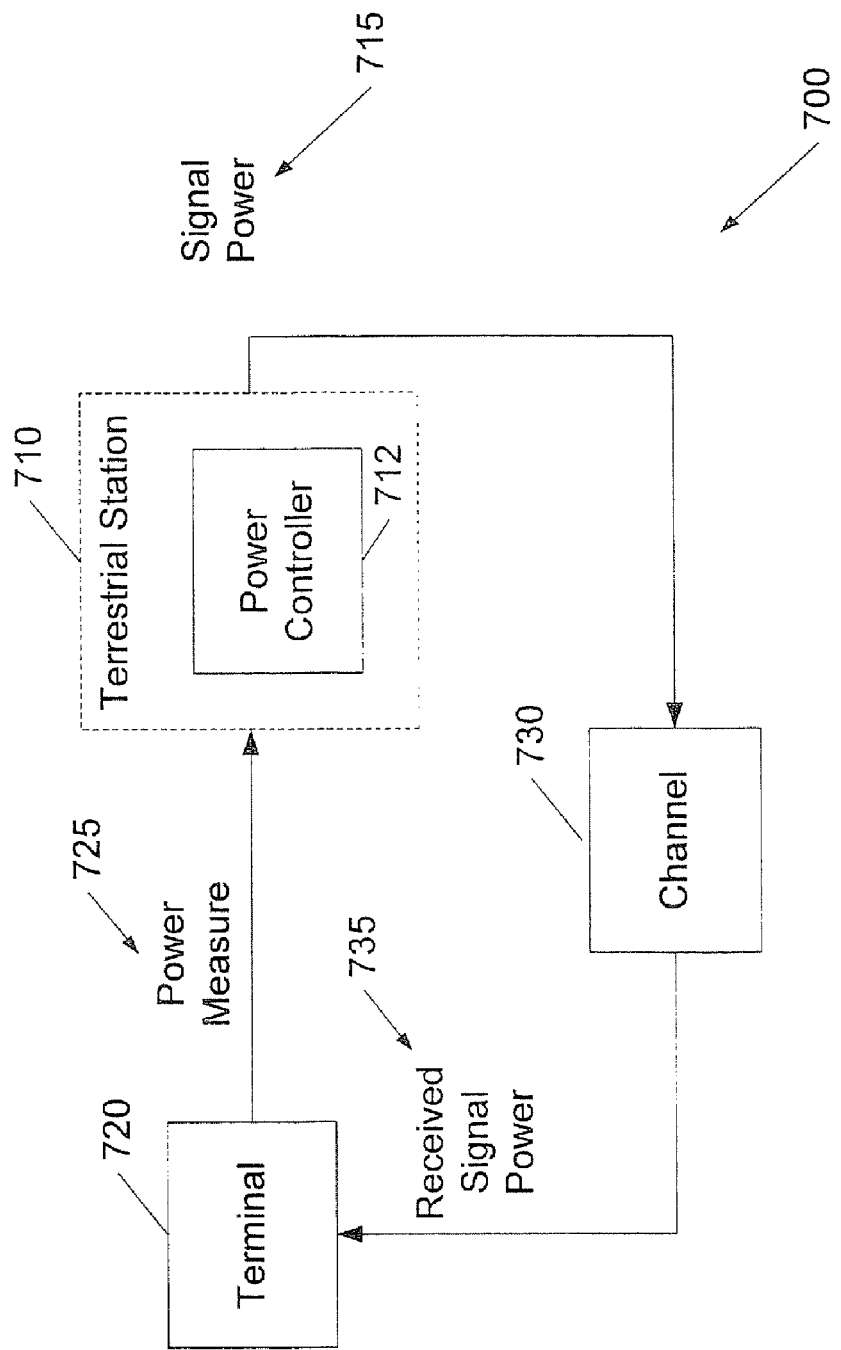

FIGS. 5-7 illustrate exemplary signal power control loop configurations that may be used when a terminal is indirectly communicating with a satellite via a terrestrial station according to further embodiments of the present invention. FIG. 5 illustrates an exemplary power control loop 500 for controlling transmitted signal power for radio signals transmitted by a terminal 520 to a terrestrial station 510 of a satellite communications system such as the system 100 illustrated in FIG. 1. In particular, FIG. 5 illustrates a terminal power control architecture in which the terrestrial station 510 controls the transmitted signal power of the terminal 520. The terrestrial station 510 includes a signal power controller 512 that is operative to generate a signal power command 515 responsive to a measure of received signal power 535 of a signal transmitted over a wireless channel 530 by the terminal 520. The terrestrial station 510 is further operative to transmit the signal power command 515 to the terminal 520. The terminal 520 receives the signal power command 515 and responsively controls its transmitted signal power 525. It will be appreciated that the power command 515 may comprise, for example, an indication of a desired absolute power level (e.g., X watts) and/or an incremental command, e.g., a command to increase or decrease the transmitted signal power 525 by a predetermined amount.

FIG. 6 illustrates an alternative signal power control loop 600 in which a signal power controller 622 is resident in a terminal 620, rather than in a terrestrial station 610. The terrestrial station 610 receives signals from the terminal 620 over a radio channel 630. The terrestrial station 610 responsively determines received signal power 635 for the signal and transmits a measure 615 of the received signal power back to the terminal 620. The power controller 622 controls a transmitted signal power 625 of the terminal 620 responsive to the communicated power measure 615, i.e., using the power measure 615 as a feedback signal.

FIG. 7 illustrates an exemplary power control loop 700 for controlling signal power for radio signals transmitted to a terminal 720 by a terrestrial station 710 of a satellite communications system, such as the system 100 illustrated in FIG. 1. The terminal 720 receives radio signals transmitted by the terrestrial station 710 over a radio channel 730. The terrestrial station 710 includes a signal power controller 712 that is operative to control its transmitted signal power 715 responsive to a measure 725 of received signal power 735 generated by the terminal 720. It will be appreciated that, in further embodiments of the present invention, an alternative to the configuration in FIG. 7 could involve providing the signal power control capability in the terminal 720, e.g., by providing a controller in the terminal 720 that transmits power commands to the terrestrial station 710.

Referring again to FIG. 1, in some embodiments of the invention, when a terminal 10 is communicating indirectly with a satellite 120 via a terrestrial station 110, power control loops, such as those described above with reference to FIGS. 5-7, may operate independently of links between the terrestrial station 110 and the satellite 120 and/or other components 130 of the system 100. For example, a separate power control loop may be used to control transmissions between the terrestrial station 110 and the satellite 120 and/or between the terrestrial station 110 and the gateway 132. Alternatively, a power control loop between the terminal 10 and the terrestrial station 110 may be interdependent with one or more power control loops that cover links between the terrestrial station and other parts of the system 100.

Figure 8:
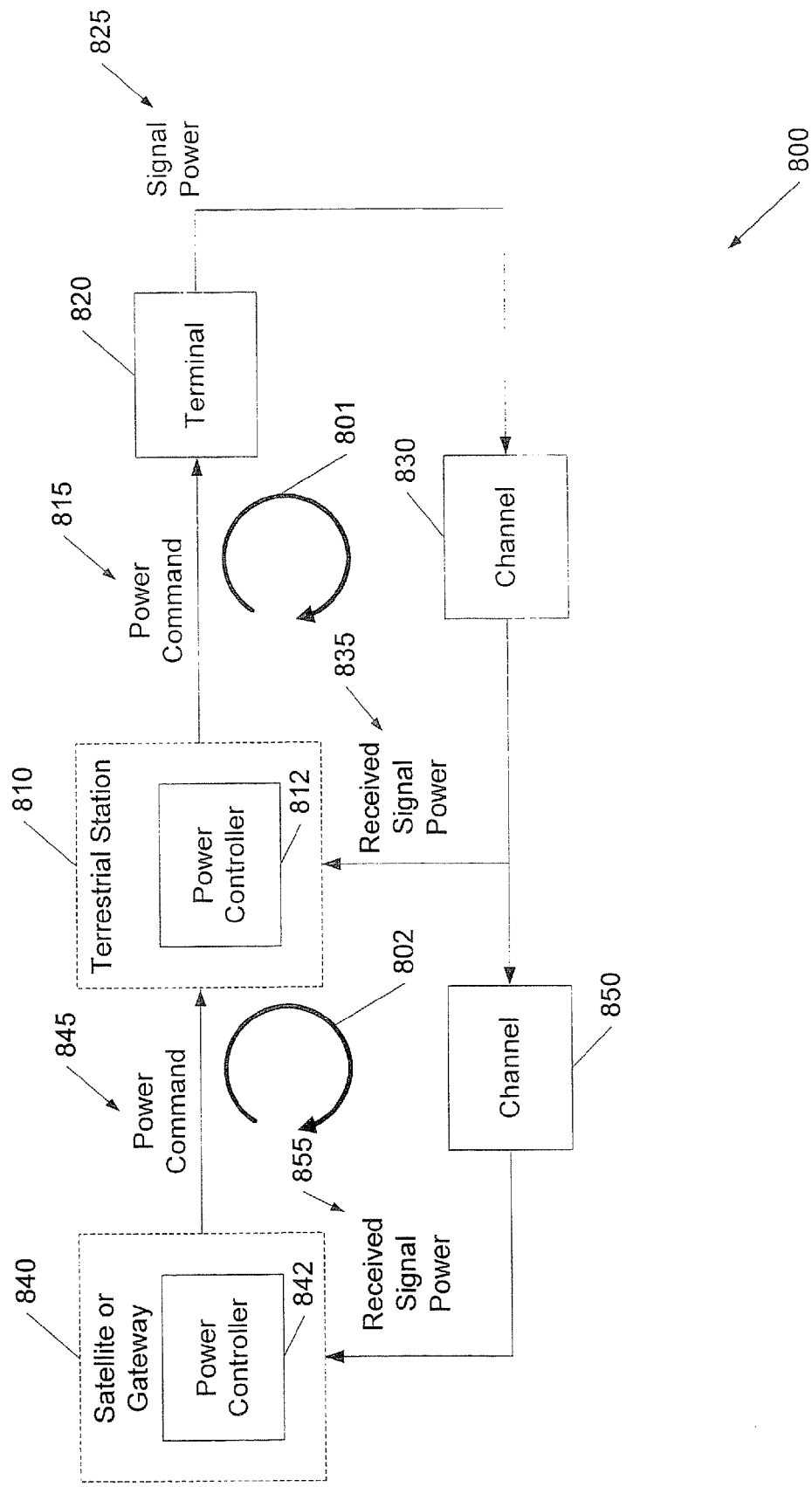

For example, FIG. 8 illustrates an exemplary nested signal power control loop configuration that may be used when a terminal is indirectly communicating with a satellite via a terrestrial station as shown, for example, in FIG. 1, according to further embodiments of the present invention. In an inner signal power control loop 801, a power controller 812 at a terrestrial station 810 develops a power command 815 responsive to a power command 845, developed by an outer power control loop 802, and a signal representing received signal power 835 of a signal transmitted by a terminal 820 over a channel 830, i.e., a channel coupling the terminal 820 to the terrestrial station 810. The terminal 820 receives the power command 815 and responsively controls its transmitted signal power 825.

The outer loop power command 845 is generated by another power controller 842 resident in the satellite communications system, e.g., at a satellite and/or gateway 840. As shown, the power command 845 is developed by the power controller 842 responsive to a received signal power 855 of a signal transmitted by the terminal 820 and/or the terrestrial station 810 over a channel 830 linking the terminal 820 to the terrestrial station 810 and/or a channel 850 linking the terrestrial station 810 to the satellite or gateway 840.

Figure 9:
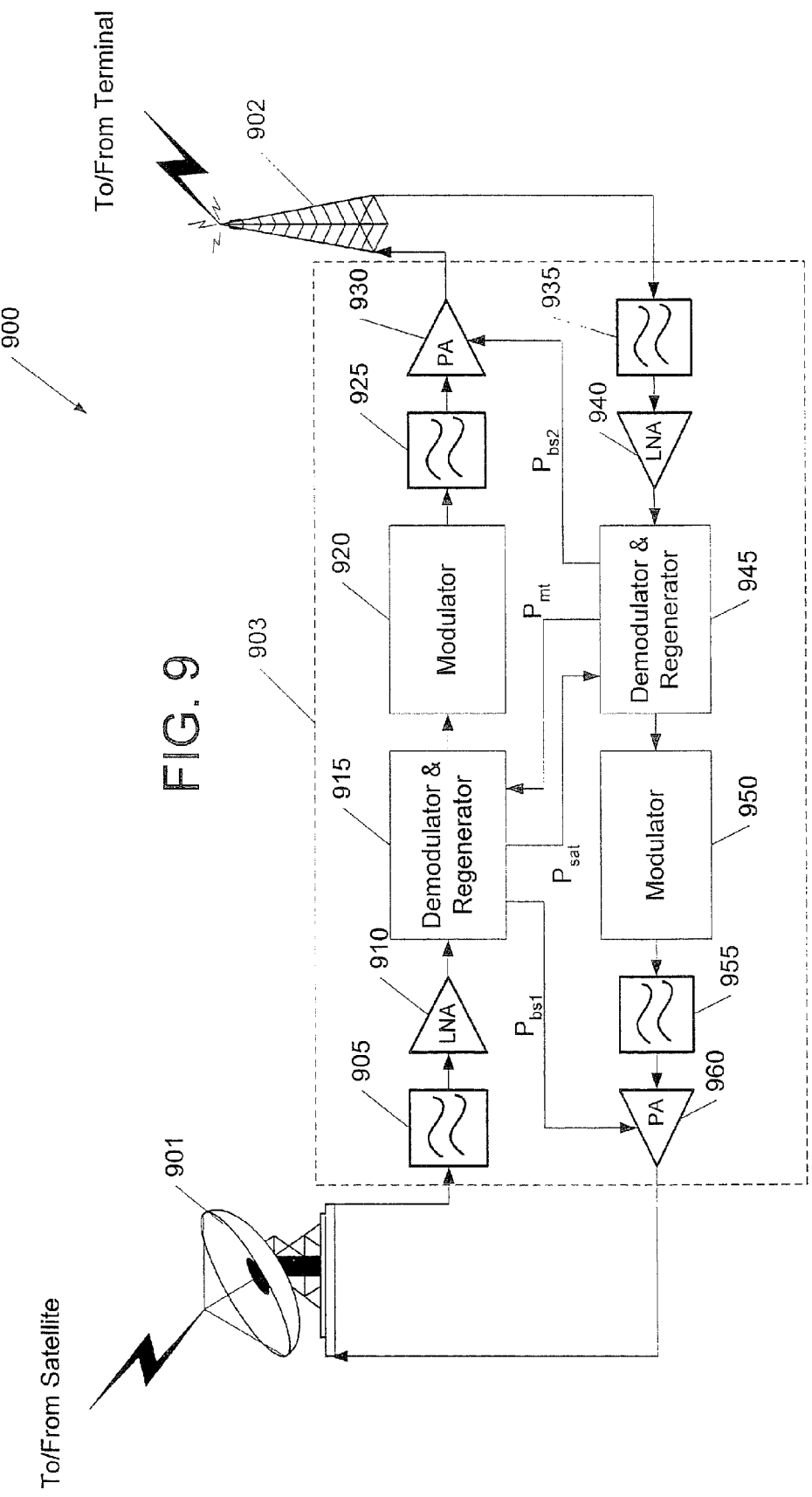
FIG. 9 is a schematic diagram illustrating exemplary signal power control information flow in a terrestrial station according to further embodiments of the present invention.

FIG. 9 illustrates an example of how power control may be implemented in a satellite-linked terrestrial station, such as the terrestrial station 110 of FIG. 1. A satellite-linked terrestrial station 900 includes a satellite antenna 901, a terrestrial antenna 902 and an interface converter 903. In the interface converter 903, signals received from a satellite via the satellite antenna 901 are processed by a bandpass filter 905 and a low noise amplifier (LNA) 910. The signal produced by the LNA 910 is processed by a demodulator & regenerator unit 915 to convert received information to a format, e.g., a bitstream or other datastream, suitable for remodulation and transmission to a terminal. The demodulator & regenerator unit 915 may, for example, produce datastreams that correspond to a GSM carrier frame format, and/or the frame format associated with any other protocol, that are to be transmitted from the terrestrial antenna 902 to one or more terminals. The demodulator & regenerator unit 915 may include or be associated with an interference reducer, such as a decision feedback interference reducer (not shown), that reduces interference in the signals received by the satellite antenna 901, e.g., interference generated by transmissions from the terrestrial antenna 902. The information recovered from the demodulator & regenerator unit 915 may then be remodulated by a modulator component 920. The remodulated signal is then filtered and amplified by a filter 925 and a power amplifier 930 to produce a signal for transmission to a terminal via the terrestrial antenna 902.

Signals received from a terminal via the terrestrial antenna 902 are processed by a bandpass filter 935 and an LNA 940. The signal produced by the LNA 940 is processed by a demodulator & regenerator unit 945 to convert received information to a format suitable for remodulation and transmission to a satellite via the satellite antenna 901. The demodulator & regenerator unit 945 may, for example, produce a datastream that corresponds to a plurality of GSM carriers (and/or carriers associated with any other protocol or air interface standard) received by the terrestrial antenna 902. The demodulator & regenerator unit 945 may include or be associated with an interference reducer, such as a decision feedback interference reducer (not shown), that reduces interference in the signals received by the terrestrial antenna 902, e.g., interference generated by transmissions from the satellite antenna 901. The information recovered from the demodulator & regenerator unit 945 is remodulated in a modulator component 950. The modulated signal is then filtered and amplified by a filter 955 and a power amplifier 960 to produce a signal for transmission to a satellite via the satellite antenna 901.

Information extracted by the demodulator and regenerator unit 915 may include signal power information, $P_{bs1}$, relating to a level of a signal power that has been transmitted and/or is to be transmitted from the satellite antenna 901. For example, the power information $P_{bs1}$ may comprise information representing a measure of a received signal power at a satellite and/or at an associated satellite gateway. The signal power information $P_{bs1}$ may be used to control the transmit power amplifier 960 to substantially achieve a desired transmit power level from the satellite antenna 901. For example, the signal power information $P_{bs1}$ may comprise a power command generated by a signal power controller (not shown) at the satellite and/or at the satellite gateway, and the power amplifier 960 may vary a transmit power responsive to the power command. In alternative embodiments, the signal power information $P_{bs1}$ may comprise a measure of power, and a signal power controller incorporated with the power amplifier 960 may use this information as a control signal to adjust an output power of power amplifier 960.

The demodulator and regenerator unit 915 may also be operative to make its own received signal power measurements to develop signal power control information, $P_{sat}$, relating to a signal received via the satellite antenna 901. The power control information $P_{sat}$, which may be in the form of a power measurement and/or a power command, may be provided to the other demodulator and regenerator unit 945 for insertion in an outbound data stream such that the power control information may be conveyed back to the satellite and/or the satellite gateway(s) for use in controlling transmissions to the terrestrial station 900.

A similar approach may be used on the terrestrial (terminal) side. In particular, information extracted by the demodulator and regenerator unit 945 may include power information, $P_{bs2}$, relating to a received signal power of a signal transmitted from the terrestrial antenna 902. For example, the power information $P_{bs2}$ may comprise information indicating a received signal power measurement at a terminal. The signal power information $P_{bs2}$ may be used to control the transmit power amplifier 930 to achieve a desired transmit power level. For example, the signal power information $P_{bs2}$ may comprise a measure of a signal power that is received by a terminal, and a signal power controller that may be incorporated with the power amplifier 960 (or may be configured externally to power amplifier 930) may use this information as a feedback signal to adjust an output power level of power amplifier 930.

The demodulator and regenerator unit 945 may also be operative to make its own received signal power measurements to develop signal power information $P_{mt}$ relating to signal power of a signal received via the terrestrial antenna 902. The power control information $P_{mt}$, which may be in the form of a power measurement and/or a power command, may be provided to the other demodulator and regenerator unit 915, e.g., for insertion in an outbound data stream such that the power control information may be conveyed back to the terminal for use in controlling transmissions to the terrestrial station 900. It will be appreciated that the power control information flows illustrated in FIG. 9 may support, for example, each of the control loop configurations shown in FIGS. 5-7.

Referring again to FIG. 9, in some embodiments, in order to reduce a potential for interference, the terrestrial antenna 902 may be configured to communicate information to a terminal by radiating a substantially orthogonal polarization relative to a polarization that may be used by another system, particularly if the other system may be reusing at least some of the frequencies that may also be used by the terrestrial antenna 902 to communicate with the terminal. In some embodiments, in order to increase a return-link margin from a terminal to the terrestrial station 900, the terrestrial antenna 902 may be configured to receive information from the terminal via at least two substantially orthogonally polarized elements that may also be operative in a space diversity configuration. In other embodiments, in order to improve an efficiency measure of a link and/or reduce a potential for interference, the radiation pattern of the terrestrial antenna 902 in a forward- and/or a return-link may be responsive to a measure of location of a terminal. Still in other embodiments, the terrestrial station 900 may be configured to communicate with a terminal in a Time Division Duplex (TDD) mode.

In the drawings and specification, there have been disclosed exemplary embodiments of the invention. Although specific terms are employed, they are used in a generic and descriptive sense only and not for purposes of limitation, the scope of the invention being defined by the following claims.

What is claimed is:

1. A method of operating a satellite wireless communications system including a satellite configured to communicate with terminals directly and to communicate with terminals indirectly via a base station, the method comprising:
   providing a first signal power control loop that controls transmitted signal power through a first communication link between the base station and a terminal;
   providing a second signal power control loop that controls transmitted signal power through a combination of the first communication link and a second communication link between the base station and the satellite concurrent with provision of the first signal power control loop; and
   wherein the second signal power control loop includes the base station controlling transmitted signal power for the first communication link using a first output of a second demodulator to control an output level of a first power amplifier and using a second output of the second demodulator to generate first power control information that is transmitted with first information to the terminal, and controlling a transmitted signal power of the second communication link using a first output of a first demodulator to control an output level of a second power amplifier and using a second output of the first demodulator to generate second power control information that is transmitted with second information to the satellite.

2. A method according to claim 1, wherein the base station is configured on a vehicle.

3. A method according to claim 1, wherein the base station is distributed over a geographic region.

4. A method according to claim 1, wherein the base station is substantially localized at a specific geographic location.

5. A method according to claim 1, wherein the base station transmits information to a terminal using a polarization that is substantially orthogonal to a polarization used by another system.

6. A method according to claim 1, wherein the base station receives information from a terminal using at least two antenna elements that are substantially orthogonally polarized therebetween and/or are configured in a space diversity configuration.

7. A method according to claim 1, wherein the base station receives and/or transmits information in a Time Division Duplex (TDD) mode and/or via an antenna pattern that is responsive to a location of a terminal.

8. A method according to claim 1, further comprising providing a signal power control loop for a direct communication link between the terminal and the satellite when the terminal is in direct communication with the satellite.

9. A method according to claim 1, wherein the first signal power control loop controls transmitted signal power of the terminal and/or the base station.

10. A method according to claim 1, wherein the first signal power control loop controls transmitted signal power through the first communication link responsive to the second signal power control loop controlling transmitted signal power through the combination of the first communication link and the second communication link.

11. A method according to claim 1, wherein providing a first signal power control loop for a first communication link between the base station and a terminal comprises:
  receiving a signal transmitted by the terminal at the base station;
  generating power control information responsive to the received signal;
  communicating the power control information to the terminal from the base station; and
  controlling a transmitted signal power of the terminal responsive to the communicated power control information.

12. A method according to claim 11:
  wherein generating power control information responsive to the received signal comprises generating a measure of received signal power;
  wherein communicating the power control information to the terminal from the base station comprises communicating the measure of received signal power; and
  wherein controlling a transmitted signal power of the terminal responsive to the communicated power control information comprises controlling a signal power of the terminal using the communicated measure of received signal power as a control feedback signal.

13. A method according to claim 12:
  wherein generating power control information responsive to the received signal comprises generating a power command;
  wherein communicating the power control information to the terminal from the base station comprises communicating the power command; and
  wherein controlling a transmitted signal power of the terminal responsive to the communicated power control information comprises controlling a signal power of the terminal to conform to the communicated power command.

14. A method according to claim 1, wherein providing a first signal power control loop for a first communication link between the base station and a terminal comprises:
  receiving a signal transmitted by the base station at the terminal;
  generating power control information responsive to the received signal;
  communicating the power control information to the base station from the terminal; and
  controlling a transmitted signal power of the base station responsive to the communicated power control information.

15. A method according to claim 14:
  wherein generating power control information responsive to the received signal comprises generating a measure of received signal power;
  wherein communicating the power control information to the base station from the terminal comprises communicating the measure of received signal power; and
  wherein controlling a transmitted signal power of the base station responsive to the communicated power control information comprises controlling a signal power of the base station using the communicated measure of received signal power as a control feedback signal.

16. A method according to claim 14:
  wherein generating power control information responsive to the received signal comprises generating a power command;
  wherein communicating the power control information to the base station from the terminal comprises communicating the power command; and
  wherein controlling a transmitted signal power of the base station responsive to the communicated power control information comprises controlling the signal power of the base station to conform to the communicated power command.

17. A wireless communications system comprising:
  a satellite configured to communicate with terminals directly and to communicate with terminals indirectly via a base station;
  a first signal power control loop that controls transmitted signal power through a first communication link between the base station and a terminal when the terminal and the satellite are linked via the base station;
  a second signal power control loop that controls transmitted signal power through a combination of the first communication link and a second communication link between the base station and the satellite concurrent with the first signal power control loop;
  a third signal power control loop that controls transmitted signal power through a third communication link between the terminal and the satellite when the terminal is in direct communication with the satellite; and
  wherein the second signal power control loop includes a satellite link power control loop that controls transmitted signal power for the second communication link using a first output of a second demodulator, which is at the base station and converts first information received from the satellite to a format suitable for remodulation and transmission to the terminal, to control an output level of a second power amplifier, which is at the base station and amplifies remodulated second information for transmission to the satellite, and using a second output of the second demodulator to generate second power control information that is transmitted with the remodulated second information to the satellite.

18. A system according to claim 17, wherein the first signal power control loop controls transmitted signal power of the terminal and the base station.

19. A system according to claim 17, wherein the first control loop controls transmitted signal power through the first communication link responsive to the second signal power control loop controlling transmitted signal power through the combination of the first communication link and the second communication link.

* * * * *